March 1, 1927.

W. O. ROY 1,619,272

TREE

Original Filed April 26, 1920

INVENTOR,
William Ormiston Roy.

BY
Andrew W. Dson,
ATTORNEY

Patented Mar. 1, 1927.

1,619,272

UNITED STATES PATENT OFFICE.

WILLIAM ORMISTON ROY, OF MONTREAL, QUEBEC, CANADA.

TREE.

Original application filed April 26, 1920, Serial No. 376,444. Divided and this application filed February 16, 1922. Serial No. 536,856.

My invention relates to an improved form of tree, especially of a fruit tree, the grain or woody fibre of which has been so bent by artificial means, during the process of its growth, that the branch elements which normally would extend out from any particular side of the tree have a permanently and naturally retained reversed position, and hang out from the opposite side of the tree, with the result that in the upper part or crown of the trunk the grain of the wood and the adjacent limbs or branches curves or turns inward, and tends to be drawn together by the natural weight of the branches and of any load of snow, fruit or the like that may be thereupon.

Figure 1:
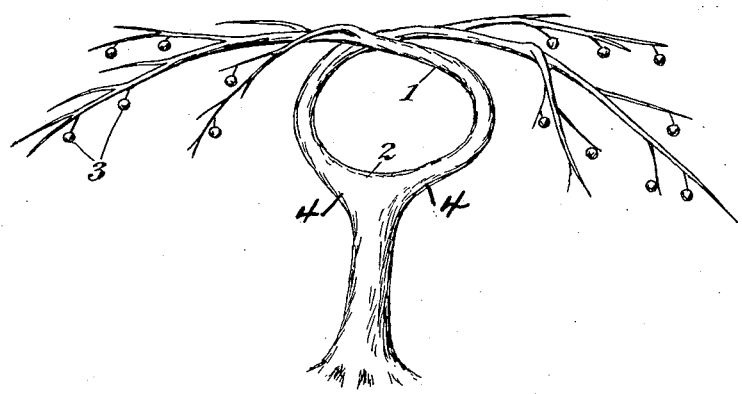
Figure 2:
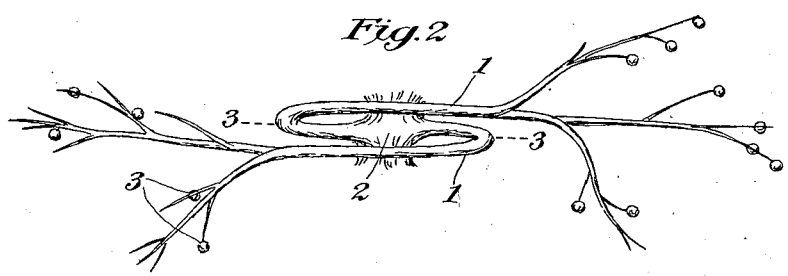
Figure 3:
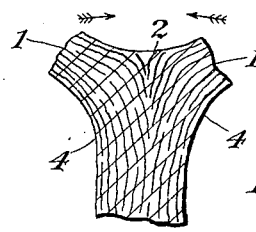

In the drawings, Fig. 1 is an elevation; Fig. 2 is a plan view of a tree embodying my improvements; and Fig. 3 is a vertical sectional view, on an enlarged scale, and taken on the line 3—3 of Fig. 2, of a section of the crotch-crown of the tree trunk.

Similar parts are designated by similar reference numerals in all the figures.

A tree formed by natural, uncontrolled growth has its branches extending continuously in a generally outward direction from the sides of the trunk to which they are attached. This results in the fibres forming the upper section of the crotches between the branches and the trunk being normally stressed or strained, so that the crotch is predisposed to split open; while the fibres embodied in the lower angles of the branches and trunk are normally compressed so as to tend to buckle or wrinkle up.

In my improved tree, however, the fibres of the branches, while still living and growing, are caused to reverse their natural direction of growth and to curve upward, inward and over, so that the weight of the branches will cause them to compress together the fibres in the crotches; while the fibres of the under sides of the branches will be stressed or pulled lengthwise, thereby producing a wood formation having a compressed or condensed crotch formation and a stretched or stressed formation about the under angles of the branches.

These results may be accomplished by producing in a young tree a plurality of leaders, as by cutting off the main leader and allowing two or more leaders to develop instead thereof. These new leaders, while still young and pliable, may be bent upward, inward, over and past the center or crotch between them, and outward on the opposite sides of the crotch from their original positions, and then held in their reversed positions by lashings or other suitable means until they have become set and will remain and continue to grow in their new positions. This results in turning the branches over, and in stretching out the fibres of their under sides, and in compressing the fibres of their upper sides, and particularly in and around the crown or crotch between the branches, where the leverage of the branches will be greatest; and the maintenance of these stresses and compressions during the growth of the tree will produce a condensed or compressed condition of the woody fibres in and around the crotch, and a stretched or stressed formation, about the under angles of the branches, thus reversing the conditions existing where the branches are permitted to grow in the usual way.

I have designated in the drawings the branches as 1, the crown of the tree trunk as 2, the fruit as 3; and the under angles of the branches as 4.

When the wood of the tree has been brought into the formation described, it will naturally carry the weight of the branches and their normally imposed loads without splitting down through the crotch-crown. And if the tree is cut and used for the purposes of lumber or manufacture, a material will be obtained which has a crotch formation developed under a contracting pressure, and thereby toughened, strengthened, and rendered less liable to split open in use; while the disadvantages incident to a buckling or wrinkling tendency in the lower angles at the base of the limbs will be avoided.

For cabinet woods, also, the durability of veneers produced from the same, and the beauty of grain figure will be enhanced when the veneers are cut from my improved tree crotches.

The advantages I have already explained in reference to the fibre formation between the trunk and branches, also exist, in degrees in the formation between the shoots from the normal under sides of the branches and the branches themselves, when reversed; as the shoots will then be above the branches, and their weight will tend to close up the crotches and not to split them open.

My improved trees are lower, more sturdy and much less liable to crotch splitting or cracking, and incident decay, than other trees of the same varieties. And the value of these differences will be well understood by those familiar with the use of trees and of crotch lumber.

Having thus described my invention what I claim and desire to secure by Letters Patent of the United States is:—

1. A self supporting tree, the branches from the main crotch of which have their fibres so disposed, through artificial causes, that the major portions of the branches are diverted from their natural direction of growth and are permanently disposed and maintain themselves over and past the central vertical line of the tree.

2. A self supporting tree trunk the fibres of the main crown-crotch of which, due to artificial training, are normally compressed and drawn together.

3. A self supporting tree trunk the fibres of the crown-crotch of which, due to artificial training, are normally compressed and drawn together, while the fibres about the lower angles between the trunk and the members of the crotch are under longitudinal tension.

4. Wood having an artificially produced compressed crotch grain formation and a distended grain formation about the angles subjacent to the members of the crotch.

WILLIAM ORMISTON ROY.